United States Patent
Davies et al.

(10) Patent No.: US 6,327,159 B1
(45) Date of Patent: Dec. 4, 2001

(54) WIREFORM BRACKET FOR MANAGING COMPUTER CABLES

(75) Inventors: Douglas Davies, Meadow Vista; Michael Wortman, Roseville, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/302,018

(22) Filed: Apr. 29, 1999

(51) Int. Cl.$^7$ ....................................................... H05K 7/02
(52) U.S. Cl. .................. 361/788; 361/825; 361/826; 361/683; 174/72 A; 248/68.1; 248/49
(58) Field of Search ..................... 361/788, 684, 361/683, 825, 826; 439/368, 371, 499; 248/68.1, 49; 174/72 A

(56) References Cited

U.S. PATENT DOCUMENTS

| | | | |
|---|---|---|---|
| 5,399,812 | * 3/1995 | Woszczyna et al. | 174/97 |
| 5,535,787 | * 7/1996 | Howell | 138/167 |
| 5,688,135 | * 11/1997 | Gallagher, Sr. | 439/214 |
| 5,698,821 | * 12/1997 | Herman | 174/72 R |
| 5,752,682 | * 5/1998 | Anderson | 248/68.1 |
| 5,773,762 | * 6/1998 | Orr, Jr. et al. | 174/117 M |
| 5,834,693 | * 11/1998 | Waddell et al. | 174/65 |
| 5,893,539 | * 4/1999 | Tran et al. | 248/68.1 |
| 5,911,450 | * 6/1999 | Shibata et al. | 29/407.04 |
| 5,912,807 | * 6/1999 | Gallagher, Sr. et al. | 361/752 |
| 5,952,616 | * 9/1999 | Morrow | 174/135 |

* cited by examiner

Primary Examiner—Leo P. Picard
Assistant Examiner—David Foster
(74) Attorney, Agent, or Firm—David A. Plettner

(57) ABSTRACT

A wireform bracket provides a simple, elegant, low-cost solution for managing a large number of cables, while also allowing ample airflow at the back of a computer system. A wireform bracket in accordance with the present invention includes a plurality of bends, with each bend proximate a connector on the backplane of a computer system when the wireform bracket is attached to the back of the computer system. As cables are connected to the back of the computer system, each cable is fastened to the nearest bend using a tie-wrap, or some other cable fastening method known in the art. The present invention minimizes potential strain at the connectors by shifting any strain to the point at which the cable is attached to the wireform bracket, while also minimizing the disruption of airflow in the area immediately behind a computer system. In one embodiment, a wireform cable is formed from a ⅛ inch thick piece of steel wire, though other materials and thicknesses may be Mused. This embodiment includes eight bends and is ideally suited for use in a computer system having six PCI slots. Those skilled in the art will understand how to apply the teachings herein to adapt the present invention for use in other configurations.

12 Claims, 4 Drawing Sheets

WIREFORM BRACKET FOR MANAGING COMPUTER CABLES

FIELD OF THE INVENTION

The present invention relates to the management cables extending from computer systems. More specifically, the present invention relates to a wireform bracket that attaches proximate the rear of a computer system, and allows cables to be fastened to bends in the wireform bracket.

DESCRIPTION OF THE RELATED ART

In the art of computing, it is common to have a variety of cables coupled to various connectors at the rear of a computer system. Typically, the cables include power cables and various I/O cables which are coupled to connectors on PCI cards and other port connectors.

It is also common to stack a series of such computer systems in a rack, with the cables coupled between various systems in the rack, as well as between systems in other racks. In rack mounted systems, managing these cables is not an easy task. Consider a rack configured with six computer systems, with each computer system 12 PCI slots, a cable coupled to a connector on each PCI slot card (though a PCI slot card may have more than one connector), and a cable connected to a power connector. Such a rack will have 78 cable segments collectively coupled to the rear of the computer systems. Unless managed properly, the cables will become a tangled mass. Furthermore, a large number of cables proximate the rear of a computer system can block airflow, and potentially cause the computer system to overheat.

In the prior art, there are several techniques for dealing with cables. Such techniques include fixed troughs, hinged arms, flexible conduits, sheet metal bracketry, and molded plastic parts. However, none of these solutions provide a simple, elegant, low-cost solution for managing a large number of cables, while also allowing ample airflow at the back of a computer system.

SUMMARY OF THE INVENTION

The present invention is a wireform bracket that provides a simple, elegant, low-cost solution for managing a large number of cables, while also allowing ample airflow at the back of a computer system. A wireform bracket in accordance with the present invention includes a plurality of bends, with each bend proximate a connector on the backplane of a computer system when the wireform bracket is attached to the back of the computer system.

As cables are connected to the back of the computer system, each cable is fastened to the nearest bend using a tie-wrap, or some other cable fastening method known in the art. The present invention provides strain relief to the connectors by shifting any strain to the point at which the cable is attached to the wireform bracket, while also minimizing the disruption of airflow in the area immediately behind a computer system. The present invention also allows computer systems to be easily swapped. When swapping a computer system, all cables are disconnected and the wireform bracket is detached from the computer system. Thereafter, the wireform bracket is attached to the replacement computer system, thereby positioning cable connectors close to the corresponding connectors of the computer system and simplifying installation.

In one embodiment, a wireform cable is formed from a ⅛ inch thick piece of steel wire, though other materials and thicknesses may be used. This embodiment includes eight bends and is ideally suited for use in a computer system having six PCI slots. Those skilled in the art will understand how to adapt the teachings contained herein to adapt the present invention for use in other configurations.

DETAILED DESCRIPTION OF THE PREFERRED EMBODIMENTS

Figure 1:
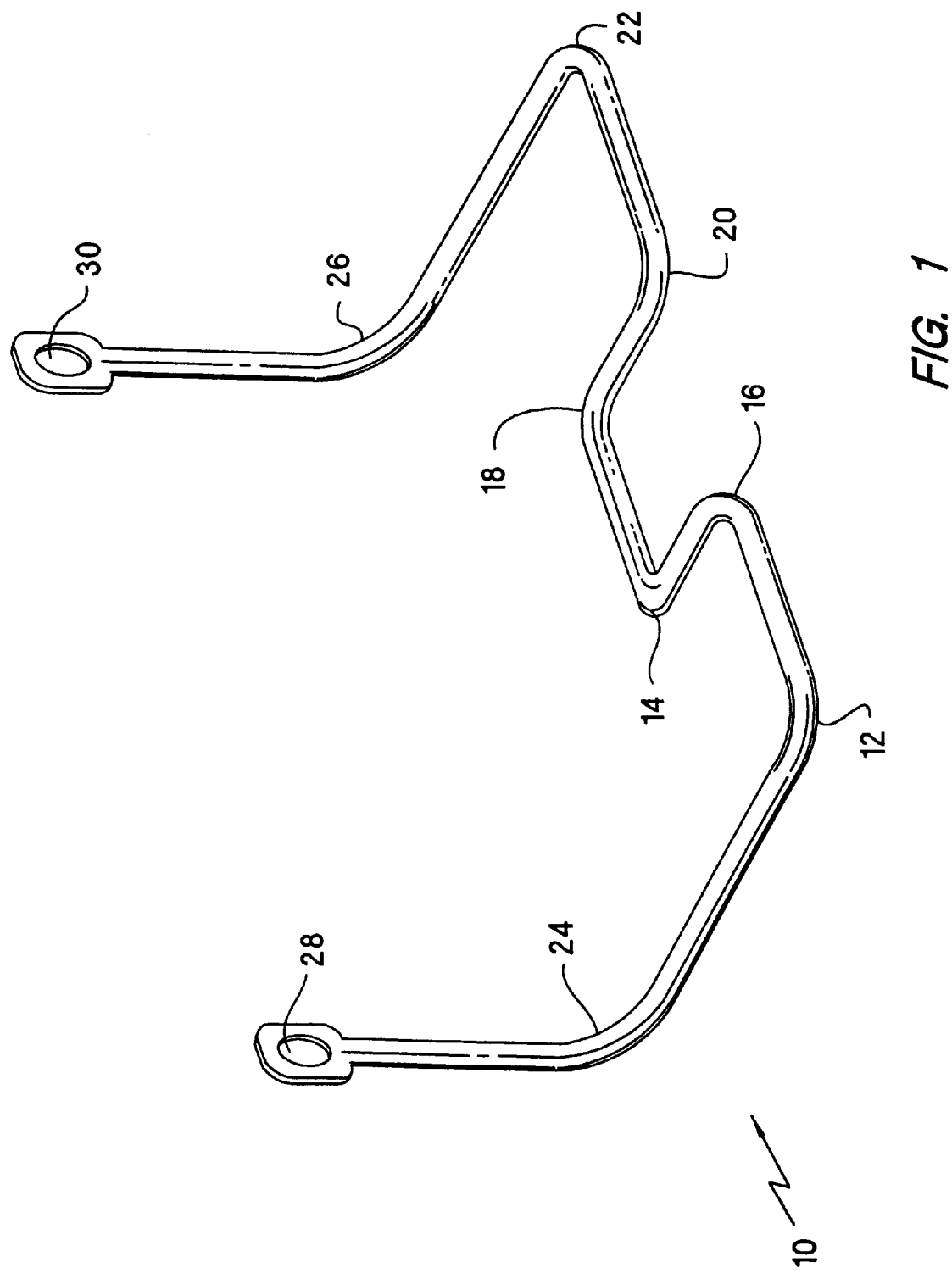
FIG. 1 is a perspective view of a wireform bracket in accordance with the present invention.

FIG. 1 is a perspective view of wireform bracket 10 in accordance with the present invention. Wireform bracket 10 includes bends 12, 14, 16, 18, 20, 22, 24, and 26. Cables from a computer system are attached to one of the bends using tie-wraps, or any other cable fastening method known in the art. Wireform bracket 10 also includes mounting holes 28 and 30, which allow bracket 10 to be attached to a computer system.

Figure 2:
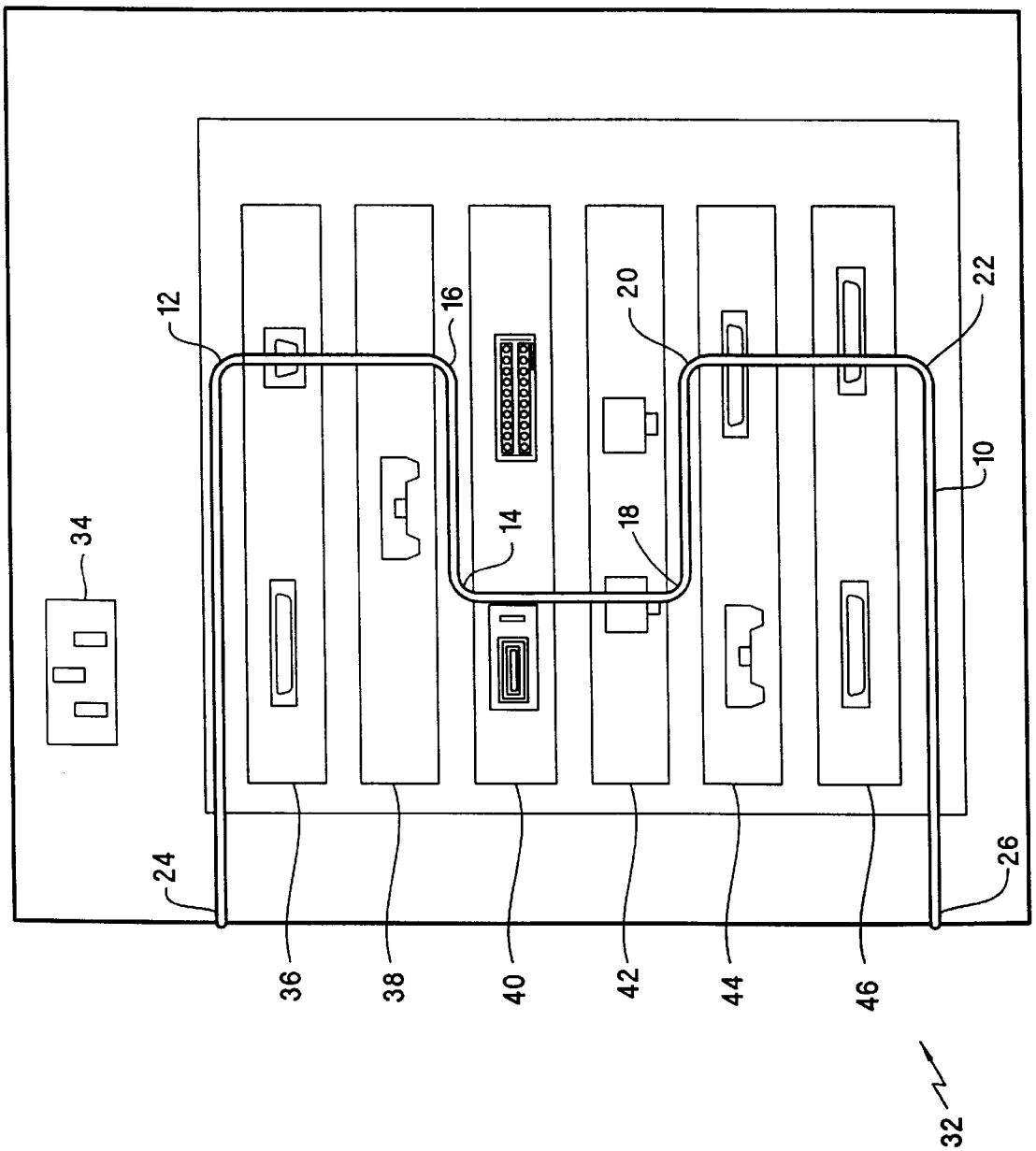
FIG. 2 shows a back of a computer system that has been provided with the wireform bracket of the present invention.

FIG. 2 shows a back of a computer system 32 that has been provided with the wireform bracket 10 of the present invention. To better illustrate the present invention, no cables are shown in FIG. 2.

Computer system 32 includes power connector 34 and PCI cards 36, 38, 40, 42, 44, and 46. Each PCI card is positioned in a PCI slot, and each PCI card includes one or two connectors. The configuration shown in FIG. 2 is merely representative. Of course, other configurations are possible.

Wireform bracket 10 is mounted to computer system 32 via mounting holes 28 and 30, which are shown in FIG. 1. Note that a bend in bracket 10 is proximate each connector. For example, cables coupled to power connector 34 may be attached at bend 24, cables coupled to PCI card 36 may be attached to bends 12 and 24, cables coupled to PCI cards 38 and 40 may be attached to bends 14 and 16, cables coupled to PCI cards 42 and 44 may be attached to bends 18 and 20, and cables coupled to PCI card 46 may be attached to bends 22 and 26.

Figure 3:
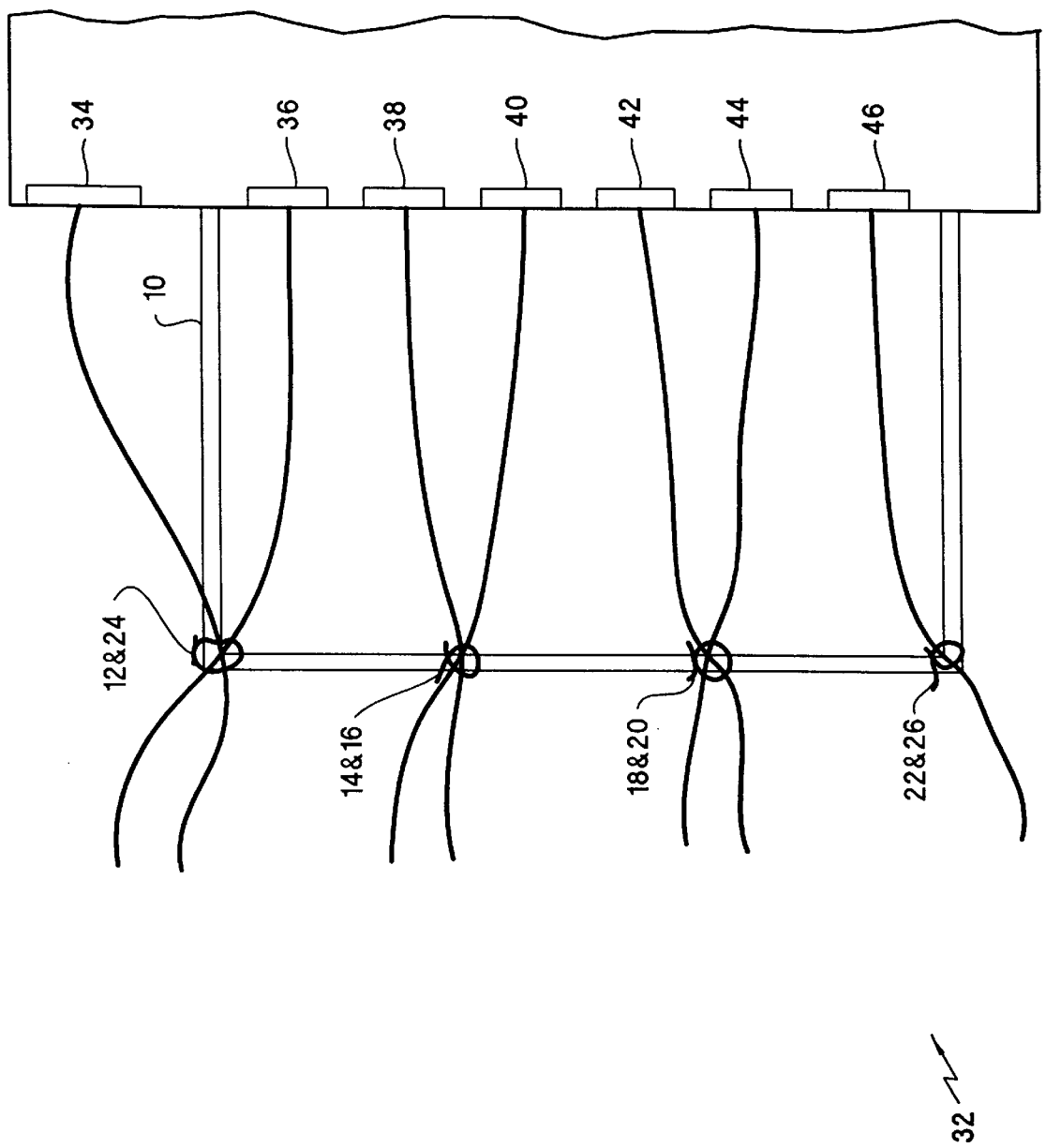
FIG. 3 is a view from the side of the computer system of FIG. 2, and illustrates how the wireform bracket of the present invention distributes cables from top to bottom.
Figure 4:
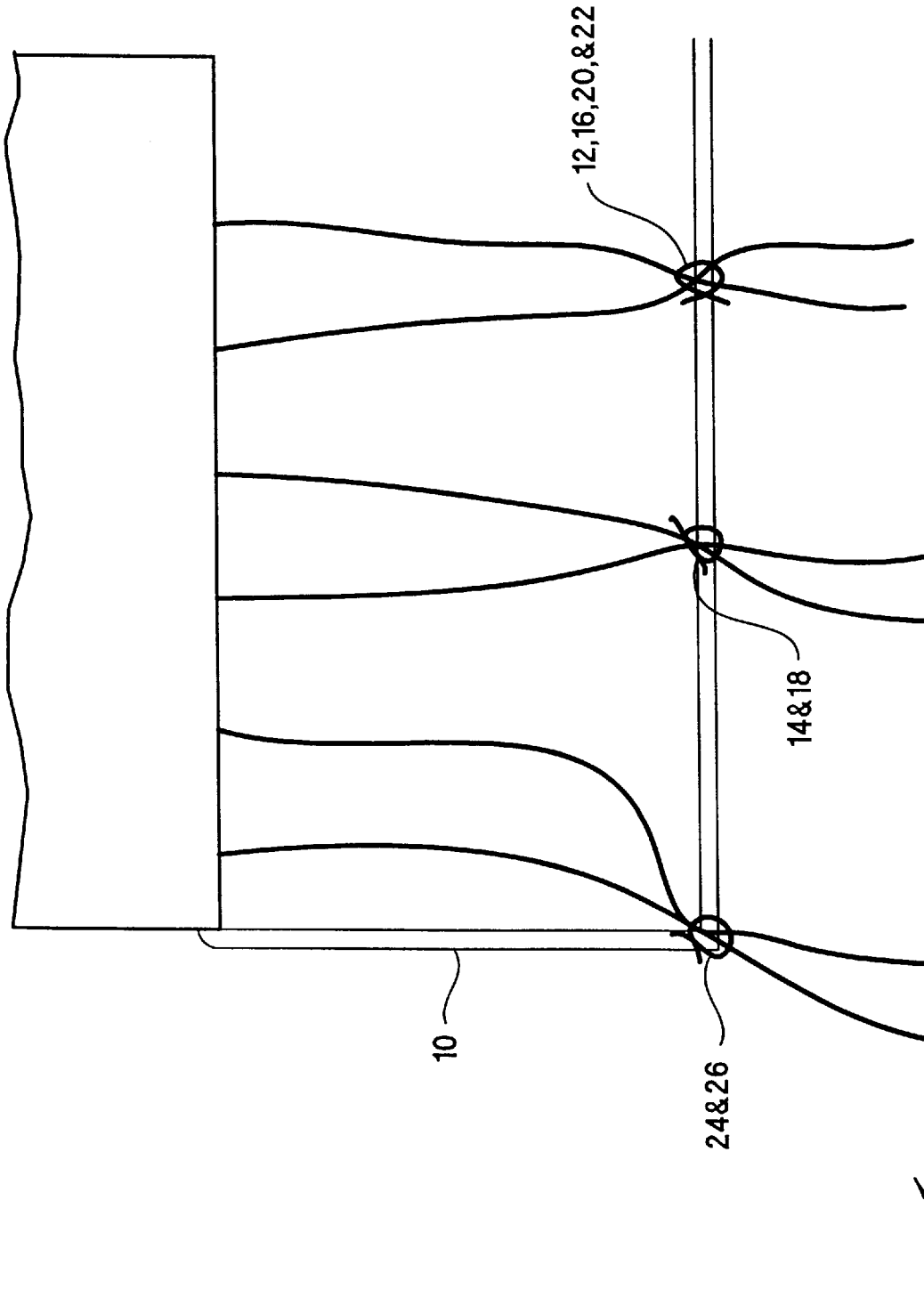
FIG. 4 is a view from the top of the computer system of FIG. 2, and illustrates how the wireform bracket of the present invention distributes cables from left to right.

One of the advantages provided by the unique configuration of wireform bracket 10 is that cables coupled to computer system 32 may be distributed relatively evenly from top to bottom and from left to right. FIGS. 3 and 4 illustrate how the present invention advantageously manages cables coupled to a computer system.

FIG. 3 is a view from the side of computer system 32, and illustrates how wireform bracket 10 of the present invention distributes cables from top to bottom. Typically, bracket 10 will extend a couple inches out from the backplane of computer system 32. Of course, one implementing the present invention my choose to have bracket 10 closer to or farther from the backplane.

As discussed above and as shown in FIG. 3, cables coupled to power connector 34 may be attached at bend 24, cables coupled to PCI card 36 may be attached to bends 12 and 24, cables coupled to PCI cards 38 and 40 may be attached to bends 14 and 16, cables coupled to PCI cards 42 and 44 may be attached to bends 18 and 20, and cables coupled to PCI card 46 may be attached to bends 22 and 26. The cables are attached to the bends using tie-wraps, or any other method known in the art.

FIG. 4 is a view from the top of computer system 32, and illustrates how wireform bracket 10 of the present invention distributes cables from left to right. By allowing cables to be secured to bracket 10, the present invention minimizes potential strain at the point where a cable connector is coupled to a connector on a PCI card. Furthermore, the present invention allows individual cables to be removed from individual connectors, without disrupting the remaining connections. Since a temporarily disconnected cable remains fastened to bracket 10, the cable connector will remain close to the corresponding connector on the backplane of the computer system, thereby allowing the connector on the cable to be easily reattached to the computer system when needed.

Furthermore, assume that computer system 32 must be removed from a rack to be serviced or replaced. All cables can first be disconnected from system 32, and bracket 10 may be easily removed from system 32 be removing screws (or other mounting hardware) at holes 28 and 30 of bracket 10 (shown in FIG. 1). When a replacement computer system is inserted into the rack, bracket 10 is attached to the replacement system, thereby positioning the cable connectors close to the corresponding computer system connectors to which they will be attached (assuming similar configurations of the PCI cards in the replacement system).

The present invention also increases airflow in the area proximate the backplane of a computer system. As seen in FIGS. 3 and 4, the present invention does not allow cables to become grouped together in the area immediately behind the backplane. Accordingly, the present invention helps computer systems from overheating.

Wireform bracket 10 may be made of any suitable material, such as a metallic material or a high-strength polycarbonate material. In one embodiment, bracket 10 is formed from ⅛ inch diameter steel wire. The steel wire is bent in a manner shown in FIG. 1. The ends of the wire are flattened, and holes 26 and 30 are punched through the flattened ends.

Note that the bend configuration shown in FIG. 1 is just one configuration that is suitable for use with a computer system having six PCI slots. However, those skilled in the art will recognize that a variety of other configurations may be used. In accordance with the teachings provided herein, it is desirable to select a configuration wherein a bend is provided proximate each connector, and the bracket distributes cables fairly evenly from top to bottom and from left to right.

In conclusion, the present invention provides a simple, elegant, low-cost solution for managing a large number of cables, while also allowing ample airflow at the back of a computer system. A wireform bracket in accordance with the present invention is especially advantageous when used in conjunction with rack-mounted systems having a large number of cables that must be managed.

Although the present invention has been described with reference to preferred embodiments, workers skilled in the art will recognize that changes may be made in form and detail without departing from the spirit and scope of the invention.

What is claimed is:

1. A wireform bracket for managing cables coupled to a computer system having a plurality of PCI slots comprising:

a first flattened end having a hole formed therein, the hole providing an attachment point for attaching the wireform bracket to the computer system;

a first relatively straight segment extending perpendicularly from a backplane of the computer system when the wireform bracket is attached to the computer system, and having first and second ends, with the first end attached to the first flattened end;

a first bend having first and second ends, with the first end of the first bend attached to the second end of the first relatively straight segment;

a second relatively straight segment extending lengthwise along one of the PCI slots and parallel to the backplane of the computer system when the wireform bracket is attached to the computer system, and having a first end attached to the second end of the first bend and a second end;

a second bend having first and second ends, with the first end of the second bend attached to the second end of the second relatively straight segment;

a third relatively straight segment extending perpendicularly relative to the second relatively straight segment across at least one other PCI slot and parallel to the backplane of the computer system when the wireform bracket is attached to the computer system, the third relatively straight segment having a first end coupled to the second end of the second bend and a second end;

a second flattened end having a hole formed therein, the hole providing an attachment point for attaching the wireform bracket to the computer system;

a fourth relatively straight segment extending perpendicularly from the backplane of the computer system when the wireform bracket is attached to the computer system, and having first and second ends, with the first end attached to the second flattened end;

a third bend having first and second ends, with the first end of the third bend attached to the second end of the fourth relatively straight segment;

a fifth relatively straight segment extending lengthwise along one of the PCI slots and parallel to the backplane of the computer system when the wireform bracket is attached to the computer system, and having a first end attached to the second end of the third bend and a second end;

a fourth bend having first and second ends, with the first end of the fourth bend attached to the second end of the fifth relatively straight segment; and a sixth relatively straight segment extending perpendicularly relative to the fifth relatively straight segment across at least one other PCI slot and parallel to the backplane of the computer system when the wireform bracket is attached to the computer system, the sixth relatively straight segment having a first end coupled to the second end of the fourth bend and a second end, wherein cables coupled to connectors on PCI cards inserted into the PCI slots may be attached to the wireform bracket at the first, second, third, and fourth bends when the wireform bracket is attached to the computer system.

2. The wireform bracket of claim 1 wherein the first, second, third, and fourth bends each have angle of approximately 90 degrees.

3. The wireform bracket of claim 1 and further comprising:

a fifth bend having first and second ends, with the first end of the fifth bend attached to the second end of the third relatively straight segment;

a seventh relatively straight segment extending lengthwise along one of the PCI slots and parallel to the backplane of the computer system when the wireform bracket is attached to the computer system, and having a first end attached to the second end of the fifth bend and a second end;

a sixth bend having first and second ends, with the first end of the sixth bend attached to the second end of the seventh relatively straight segment;

an eighth relatively straight segment extending perpendicularly relative to the seventh relatively straight segment across at least one other PCI slot and parallel to the backplane of the computer system when the wireform bracket is attached to the computer system, the eighth relatively straight segment having a first end coupled to the second end of the sixth bend and a second end;

a seventh bend having first and second ends, with the first end of the seventh bend attached to the second end of the eighth relatively straight segment;

a ninth relatively straight segment extending lengthwise along one of the PCI slots and parallel to the backplane of the computer system when the wireform bracket is attached to the computer system, and having a first end attached to the second end of the seventh bend and a second end; and a eighth bend having first and second ends, with the first end of the eighth bend attached to the second end of the ninth relatively straight segment and the second end of the eighth bend attached to the second end of the sixth relatively straight segment.

4. The wireform bracket of claim 3 wherein the first, second, third, fourth, fifth, sixth, seventh, and eighth bends each have angle of approximately 90 degrees.

5. An assembly comprising:
a backplane of a computer system having a plurality of openings, wherein cards inserted into PCI slots adjacent the openings include connectors that are accessible via the openings;

a plurality of cables, with each cable coupled to a connector and routed away from the backplane; and a wireform bracket mounted to the computer system, the wireform bracket comprising:
a length of wire having relatively straight segments connected together by a series of bends; and
at least one attachment point attached to the computer system, wherein each cable of the plurality of cables is attached to a bend of the series of bends, and each PCI slot is proximate a bend.

6. The assembly of claim 5 wherein the length of wire is formed from a polycarbonate material.

7. The assembly of claim 5 wherein the length of wire is formed from steel wire.

8. The as of claim 5 wherein the steel wire is approximately 1/8 inch thick.

9. The assembly of claim 5 wherein the length of wire comprises:
a first flattened end having a hole formed therein, the hole providing an attachment point at which the first flattened end is attached to the computer system;

a first relatively straight segment extending perpendicularly from the backplane of the computer system, and having first and second ends, with the first end attached to the first flattened end;

a first bend having first and second ends, with the first end of the first bend attached to the second end of the first relatively straight segment;

a second relatively straight segment extending lengthwise along one of the PCI slots and parallel to the backplane of tie computer system, and having a first end attached to the second end of the first bend and a second end;

a second bend having first and second ends, with the first end of the second bend attached to the second end of the second relatively straight segment;

a third relatively straight segment extending perpendicularly relative to the second relatively straight segment across at least one other PCI slot and parallel to the baokplane of the computer system, the third relatively straight segment having a first end coupled to the second end of the second bend and a second end;

a second flattened end having a hole formed therein, the hole providing an attachment point at which the second flattened end is attached to the computer system;

a fourth relatively straight segment extending perpendicularly from the backplane of the computer system, and having first and second ends, with the first end attached to the second flattened end;

a third bend having first and second ends, with the first end of the third bend attached to the second end of the fourth relatively straight segment;

a fifth the relatively straight segment extending lengthwise along one of the PCI slots and parallel to the backplane of the computer system, and having a first end attached to the second end of the third bend and a second end;

a fourth bend having first and second ends, with the first end of the fourth bend attached to the second end of the fifth relatively straight segment; and a sixth relatively straight segment extending perpendicularly relative to the fifth relatively straight segment across at least one other PCI slot and parallel to the backplane of the computer system, the sixth relatively straight segment having a first end coupled to the second end of the fourth bend and a second end.

10. The assembly of claim 9 wherein the first, second, third, and fourth bends each have angle of approximately 90 degrees.

11. The assembly of claim 9 wherein the wireform bracket further comprises:
a fifth bend having first and second ends, with the first end of the fifth bend attached to the second end of the third relatively straight segment;

a seventh relatively straight segment extending lengthwise along one of the PCI slots and parallel to the backplane of the computer system, and having a first end attached to the second end of the fifth bend and a second end;

a sixth bend having first and second ends, with the first end of the sixth bend attached to the second end of the seventh relatively straight segment;

an eighth relatively straight segment extending perpendicularly relative to the seventh relatively straight segment across at least one other PCI slot and parallel to the backplane of the computer system, the eighth relatively straight segment having a first end coupled to the second end of the sixth bend and a second end;

a seventh bend having first and second ends, with the first end of the seventh bend attached to the second end of the eighth relatively straight segment;

a ninth relatively straight segment extending lengthwise along one of the PCI slots and parallel to the backplane of the computer system, and having a first end attached to the second end of the seventh bend and a second end; and a eighth bend having first and second ends, with the first end of the eighth bend attached to the second end of the ninth relatively straight segment and the second end of the eighth bend attached to the second end of the sixth relatively straight segment.

12. The assembly of claim 11 wherein the first, second, third, fourth, fifth, sixth, seventh, and eighth bends each have angle of approximately 90 degrees.

\* \* \* \* \*

UNITED STATES PATENT AND TRADEMARK OFFICE
CERTIFICATE OF CORRECTION

PATENT NO.   : 6,327,159 B1
DATED        : December 4, 2001
INVENTOR(S)  : Douglas Davies et al.

It is certified that error appears in the above-identified patent and that said Letters Patent is hereby corrected as shown below:

Title page,
Item [57], ABSTRACT,
Line 17, delete "Mused." and insert therefor -- used. --

Column 3,
Line 22, before "removing" delete "be" and insert therefor -- by --

Column 4,
Line 56, delete "slats" and insert therefor -- slots --

Column 5,
Line 54, delete "as" and insert therefor -- assembly --

Column 6,
Line 3, delete "tie" and insert therefor -- the --
Line 11, delete "baokplane" and insert therefor -- backplane --

Signed and Sealed this

Twenty-ninth Day of June, 2004

JON W. DUDAS
*Acting Director of the United States Patent and Trademark Office*